Nov. 16, 1965   J. H. CASTOE   3,218,032
TOOL FOR ADJUSTING VEHICLE STEERING KNUCKLE
Filed Jan. 13, 1964
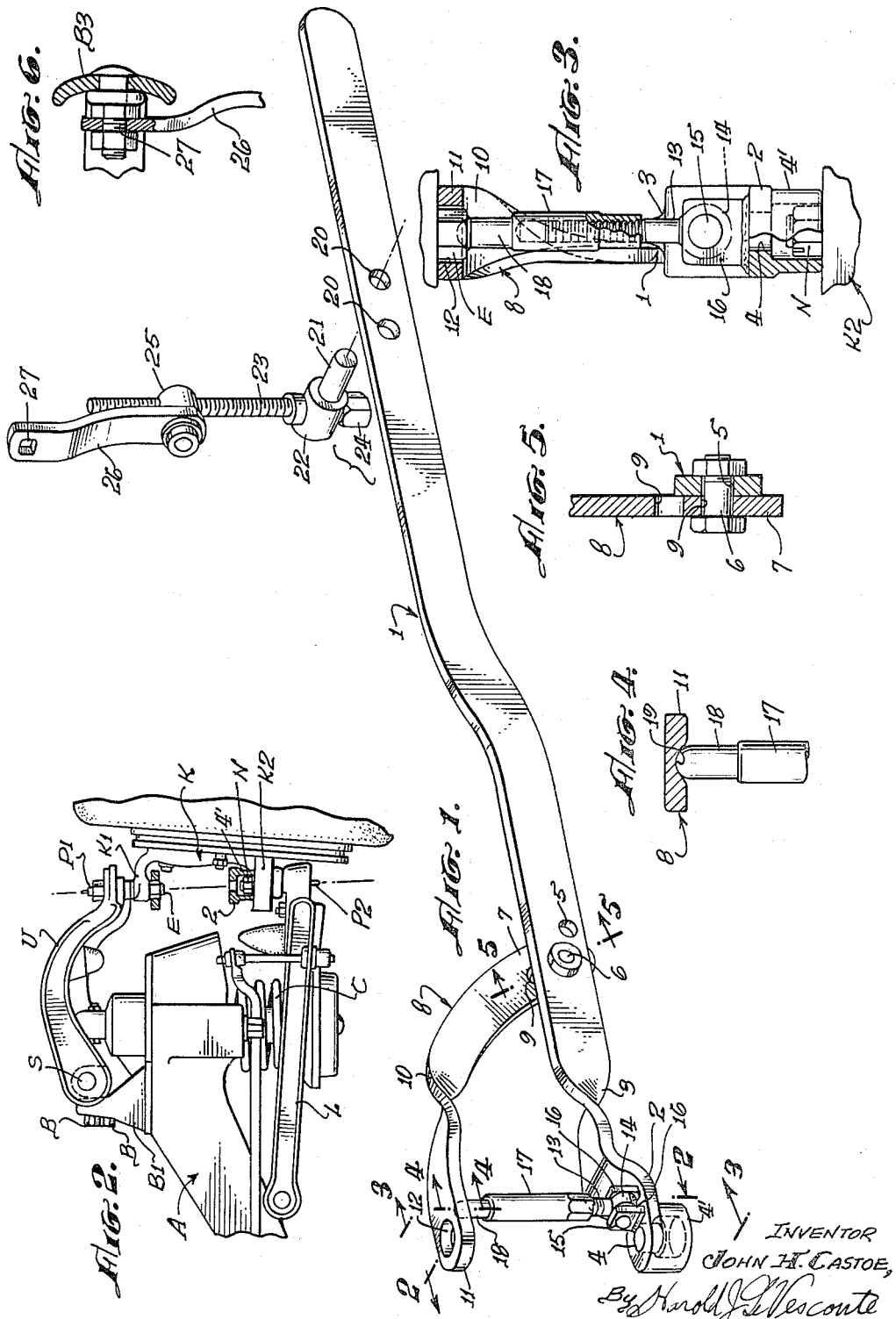
INVENTOR
JOHN H. CASTOE,
By Harold J. LeVesconte
ATTORNEY

United States Patent Office 3,218,032
Patented Nov. 16, 1965

3,218,032
TOOL FOR ADJUSTING VEHICLE
STEERING KNUCKLE
John H. Castoe, 6718 Shady Grove St., Tujunga, Calif.
Filed Jan. 13, 1964, Ser. No. 337,238
5 Claims. (Cl. 254—126)

This invention relates to the repair, maintenance and adjustment of front end frame suspension and support means of motor vehicles and particularly those constructions involving independently sprung front wheels.

The principal object of the invention is to provide a means whereby the angle of the steering knuckle pin axes in a plane extending transversely of the vehicle can be adjusted directly with respect to the frame of the vehicle.

Another object of the invention is to provide a device in which the foregoing objective is attained having one portion attachable to a vehicle steering means in the axial line of movement of a steering knuckle and another portion attached to a remote portion of the vehicle frame with interposed adjusting means for moving the steering knuckle with which it is associated to change the axial line of movement of the steering knuckle relative to the vertical in a plane containing said axial line and extending generally longitudinally of the vehicle.

With the foregoing objects in view, together with such additional objects and advantages as may subsequently appear, the invention resides in the parts and in the construction, combination and arrangement of parts described, by way of example, in the following specification of a presently preferred embodiment of the invention, reference being had to the accompanying drawings which form a part of said specification and in which drawings:

FIG. 1 is a perspective, partially exploded view of an adjusting device representing a presently preferred embodiment of the invention, FIG. 2 is a reduced scale, front elevational view of a front wheel suspension means of a vehicle to which the invention is applied; the portion of the device applied being that to the left of a vertical plane containing and defined by the line 2—2 of FIG. 1, FIG. 3 is an enlarged scale, fragmentary, sectional view taken on the line 3—3 of FIG. 1, FIG. 4 is an enlarged, fragmentary, section taken on the line 4—4 of FIG. 1, FIG. 5 is an enlarged, fragmentary, section taken on the line 5—5 of FIG. 1, and FIG. 6 is an enlarged, fragmentary, sectional view showing the mode of attachment of the device to the frame structure of a vehicle incident to the use of the device.

FIG. 2 shows a typical vehicle front wheel suspension to which the device is attached for purposes of adjustment. In this view there is shown one end of a front axle A to which a steering knuckle K is pivotally attached by interposed upper and lower control arms U and L which in turn are pivotally mounted on separate horizontal axes on the axle A with a compression coil spring C interposed between the axle A and the lower control arm L. Axially aligned pins P1 and P2 carried by the arms U and L afford means for the pivotal movement of the steering knuckle K as determined by a steering wheel of the vehicle; the pin P1 having an end E depending below the under side of the upper arm K1 of the steering knuckle and the upper end of the pin P2 carrying a nut N disposed at the top surface of the lower steering knuckle arm K2. The upper arm U is pivotally mounted an a shaft S mounted on the axle A for adjustment along a vertical plane extending parallel to the length of the vehicle and is secured in adjusted position by bolts B, B extending through a bracket B1 fixed to the axle A, and the present invention is concerned with tilting the axial line of movement of the steering knuckle to a desired extent about the free end of the lower arm L as a center to a desired extent.

The illustrated embodiment of the invention comprises a base element 1 here shown as a steel bar of rectangular cross section having one end thereof twisted 90° as at 3 and thence being laterally offset flatwise with respect to the horizontal and provided with an opening 4 therethrough defined by a depending skirt 4' which is adapted to fit over the nut N of the steering knuckle pivot pin P2. Slightly beyond the twisted portion 3, the base element 1 is provided with a pair of transversely extending holes 5, 5 for selective engagement by a pivot bolt 6 on which an end 7 of an arm 8 is pivotally mounted; said ends of said arm similarly having a plurality of holes 9 through a selected one of which the bolt 6 extends. The arm 8 from the end 7 thereof is curved upwardly and forwardly and is twisted 90° as at 10 producing an end 11 which is above and parallel to the end 2 of the bar 1; said end being provided with an opening 12 in which the depending end of the pivot pin P2 is received.

A jack screw means is provided for holding the skirted end 2 of the base member and the corresponding end of the arm 8 engaged with the pivot pins of a steering knuckle; said means comprising an eyebolt 13 having the head 14 thereof mounted on a pivot pin 15 extending between ear members 16, 16 carried by the upper face of the base member end 2 closely adjacent the skirted portion 3 thereof and at the side thereof opposite said skirted portion. The threaded end of the bolt engages a tubular threaded sleeve terminating in a rounded distal end 18 which is engageable with a concavity 19 formed in the under face of the arm 8 adjacent the opening 12 therein. The holes 5 and 9 permit selective assembly of the arm 8 and base member 1 to suit different car wheel suspension means.

The device is attached to a steering knuckle from the front of the vehicle by first fitting the skirted opening of the end 2 of the base 1 over the nut end N of the lower steering knuckle pivot pin P2. The arm 8 is then swung up into engagement with the depending end of the upper steering knuckle pin P1 and the jackscrew means constituting the bolt 13 and sleeve 17 is swung under the arm 8 and the sleeve turned on the threaded bolt until it engages the concavity in the under face of the arm 8 and holds it spaced apart from the corresponding end of the bar 1 as best shown in FIG. 3. This causes the other end of the base member 1 to extend generally horizontally forwardly from the vehicle and beneath the front bumper B3 thereof. At points thereon which are directly beneath the front bumper on various vehicles, the base member 1 is provided with transverse holes 20 extending therethrough for selective engagement by a horizontally extending stud 21 having a vertically extending hole formed in the head 22 thereof. The bolt 23 is freely rotatable in said hole with the bolt head 24 engaging the under side of the stud head 22. The threaded shank of the bolt 23 engages a nut element 25 carried by the lower end of a strap element 26 the upper end of which is provided with a hole 27 adapted to engage the end of a bolt by which the bumper B3 is connected to its supporting bracket.

Assuming that the device has been connected to the steering knuckle pivot pins and at the outer end of the base member is connected to the bumper bracket bolt, the bolts B, B can be loosened and then the bolt 23 can be rotated to move the base member end to which it is attached toward or away from the bumper with resulting change in the tilt of the axial line of the steering knuckle pins P1 and P2 to the desired extent. The bolts B, B are then tightened and the operation repeated on the other steering knuckle. The particular advantages are that the adjustment is achieved with reference to the frame of the vehicle itself and that the relatively movable parts are held in the desired adjusted position while being tightened and secured.

While in the foregoing specification there has been disclosed a presently preferred embodiment of the invention it is not to be inferred therefrom that the invention is limited to the precise details thus disclosed by way of illustration and it will be understood that the invention includes as well all such changes and modifications in the parts and in the construction, combination and arrangement of parts as shall come within the purview of the appended claims.

I claim:

1. A device for adjusting the position of the axial line of pivotal movement of a motor vehicle steering knuckle in a vertical plane extending longitudinally of the vehicle; said device comprising an elongated, rigid base member having one end thereof adapted for engagement with a first pivot pin on which the steering knuckle is pivotally mounted, an arm pivotally carried by said base member and having an end adapted for engagement with a second pivot pin axially aligned with said first named pivot pin and constituting a part of the pivotal mounting of the steering knuckle, means interposable between said base member and said arm operative to maintain them in releasable engagement with the pivot pins, and adjustable means extending between said base member and a portion of the vehicle frame structure operable to determine the angle of the axial line of the engaged pivot pins relative to the vertical in a substantially vertical plane extending longitudinally of the vehicle.

2. A device as claimed in claim 1 in which said arm at the end thereof remote from said pin engaging end is provided with a plurality of holes for selective engagement with the pivot means carried by said base member.

3. A device as claimed in claim 1 in which said adjustable means is disposed between said base member and means associated with the front bumper supporting means of the vehicle frame structure and includes screw threaded means operable to move the engaged portion of said base member toward or away from the engaged portion of the vehicle frame structure.

4. A device as claimed in claim 1 in which said means interposable between said base member and said arm constitutes a jackscrew means having the head of the screw component thereof pivotally mounted on one of the elements between which it is interposed and having the nut component thereof provided with a rounded end engageable with a concavity in the opposing face of the other element.

5. A device as claimed in claim 2 in which said base member is provided with a plurality of holes for selective positioning of the pivot means for said arm.

References Cited by the Examiner
UNITED STATES PATENTS 2,169,898    8/1939    Minderman _____ 29—267

WILLIAM FELDMAN, *Primary Examiner.*